(12) United States Patent
Chang

(10) Patent No.: US 7,576,810 B2
(45) Date of Patent: Aug. 18, 2009

(54) PRISM SHEET AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 97 days.

(21) Appl. No.: 11/933,441

(22) Filed: Nov. 1, 2007

(65) Prior Publication Data

US 2009/0051850 A1 Feb. 26, 2009

(30) Foreign Application Priority Data

Aug. 20, 2007 (CN) .................. 2007 1 0201403

(51) Int. Cl.
  *G02F 1/1335* (2006.01)
  *G02B 5/04* (2006.01)
  *F21V 5/00* (2006.01)
  *F21V 7/04* (2006.01)

(52) U.S. Cl. .................. 349/64; 359/837; 359/831; 362/620; 362/246; 362/337

(58) Field of Classification Search ............. 349/62–64, 349/112; 359/831, 837; 362/619, 620, 244–246, 362/330–339, 355

See application file for complete search history.

(56) References Cited

U.S. PATENT DOCUMENTS

| 7,364,341 B2 * | 4/2008 | Parker et al. ............... 362/620 |
| 7,422,357 B1 * | 9/2008 | Chang ......................... 362/602 |
| 2008/0117514 A1 * | 5/2008 | Hsu et al. ................... 359/599 |
| 2009/0009894 A1 * | 1/2009 | Chuang ...................... 359/831 |

* cited by examiner

*Primary Examiner*—Kevin S Wood
(74) *Attorney, Agent, or Firm*—Frank R. Niranjan

(57) ABSTRACT

An exemplary prism sheet includes a main body having a surface. The surface defines a plurality of first V-shaped micro-protrusions and second V-shaped micro-protrusions thereon. Each of the first V-shaped micro-protrusions extends along a first curved direction. Each of the second V-shaped micro-protrusions extends along a second curved direction. The first V-shaped micro-protrusions intersect with the second V-shaped micro-protrusions. The present prism sheet and the liquid crystal display device using the same can efficiently decrease moire pattern interference between the prism sheet and the pixel pitch of LCD panel.

18 Claims, 5 Drawing Sheets

PRISM SHEET AND LIQUID CRYSTAL DISPLAY DEVICE USING THE SAME

CROSS-REFERENCE TO RELATED APPLICATIONS

This application is related to a U.S. patent application, which is: application Ser. No. 11/933,439, and entitled "PRISM SHEET AND LIQUID CRYSTAL DISPLAY DEVICE USING THE SAME". In the co-pending application, the inventor is Shao-Han Chang. The co-pending application has the same assignee as the present application. The disclosure of the above identified application is incorporated herein by reference.

BACKGROUND OF THE INVENTION

1. Field of the Invention

The present invention generally relates to optical plates, and more particularly to a prism sheet for use in, for example, a liquid crystal display (LCD).

2. Discussion of the Related Art

FIG. 4 is an exploded, side cross-sectional view of a typical liquid crystal display device 100 employing a typical prism sheet 10. The liquid crystal display device 100 includes a housing 11 and a plurality of lamps 12 disposed in the housing 11. The liquid crystal display device 100 further includes a light diffusion plate 13, a prism sheet 10, an upper light diffusion film 14 and an LCD panel 15 stacked on the housing 11 in that order. The lamps 12 emit light, and an inner wall of the housing 11 is configured for reflecting some of the light upwards. The light diffusion plate 13 includes a plurality of embedded dispersion particles. The dispersion particles are configured for scattering received light, and thereby enhancing the uniformity of light that exits the light diffusion plate 13.

Referring to FIG. 5, the prism sheet 10 includes a plurality of V-shaped structures 102 on a top surface 101. The V-shaped structure 102 extends along a straight line from one end to the other end of the prism sheet 10. A plurality of V-shaped structures 102 are regularly and periodically arranged parallel to each other. The V-shaped structures 102 are configured for collimating received light to a certain extent.

In use, light emitted from the lamps 12 enters the prism sheet 10 after being scattered in the diffusion plate 13. The light is refracted by the V-shaped structures 102 of the prism sheet 10 and is thereby concentrated, so that a brightness of light illumination is increased. Finally, the light propagates into an LCD panel 15 disposed above the prism sheet 10. However, it is prone to occur moire pattern interference on the LCD panel 15 due to the V-shaped structures 102 are aligned similarly to the LCD pixels. In order to decrease the moire pattern interference, the liquid crystal display device 100 needs to add an upper light diffusion film 14 between the prism sheet 10 and the LCD panel 15. Although the upper light diffusion film 14 is disposed on the prism sheet 10, a plurality of air pockets still exists at the boundary therebetween. When the liquid crystal display device 100 is in use, light passes through the air pockets, and some of the light undergoes total reflection at one or another of the corresponding boundary. In addition, a amount of light are absorbed by the upper light diffusion film 14. As a result, a light brightness of the liquid crystal display device 100 is reduced.

Therefore, a new prism sheet is desired in order to overcome the above-described shortcomings.

SUMMARY

A prism sheet according to a preferred embodiment includes a main body having a surface. The surface defines a plurality of first V-shaped protrusions and second V-shaped protrusions thereon. Each of the first V-shaped micro-protrusions extends along a first curved direction. Each of the second V-shaped micro-protrusions extends along a second curved direction. The first V-shaped protrusions intersect with the second V-shaped protrusions.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present prism sheet. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present prism sheet, in detail.

Figure 1:
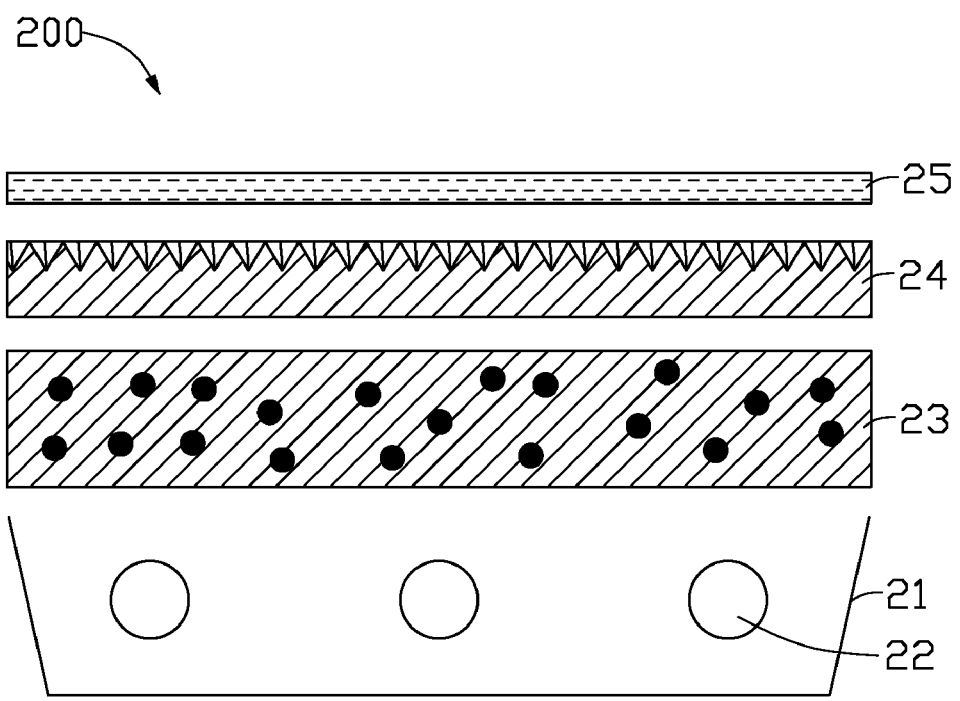
FIG. 1 is an exploded, side cross-sectional view of liquid crystal display device having a prism sheet in accordance with a first embodiment of the present invention.

Referring to FIG. 1, a liquid crystal display device 200 of the present invention is shown. The liquid crystal display device 200 includes a housing 21 and a plurality of lamps 22 disposed in the housing 21. The liquid crystal display device 200 further includes a light diffusion plate 23, a prism sheet 24 and an LCD panel 25 stacked on the housing 21 in that order. An inner wall of the housing 21 is configured for reflecting some of the light upwards. The housing 21 is made of metal or plastic materials with a high reflectivity rate. Alternatively, the inner wall of the housing 21 has a high reflectivity coating thereon for improving light reflectivity rate. The light diffusion plate 23 includes a plurality of embedded dispersion particles. The dispersion particles are configured for scattering light, and thereby enhancing the uniformity of light that exits the light diffusion plate 23.

Figure 2:
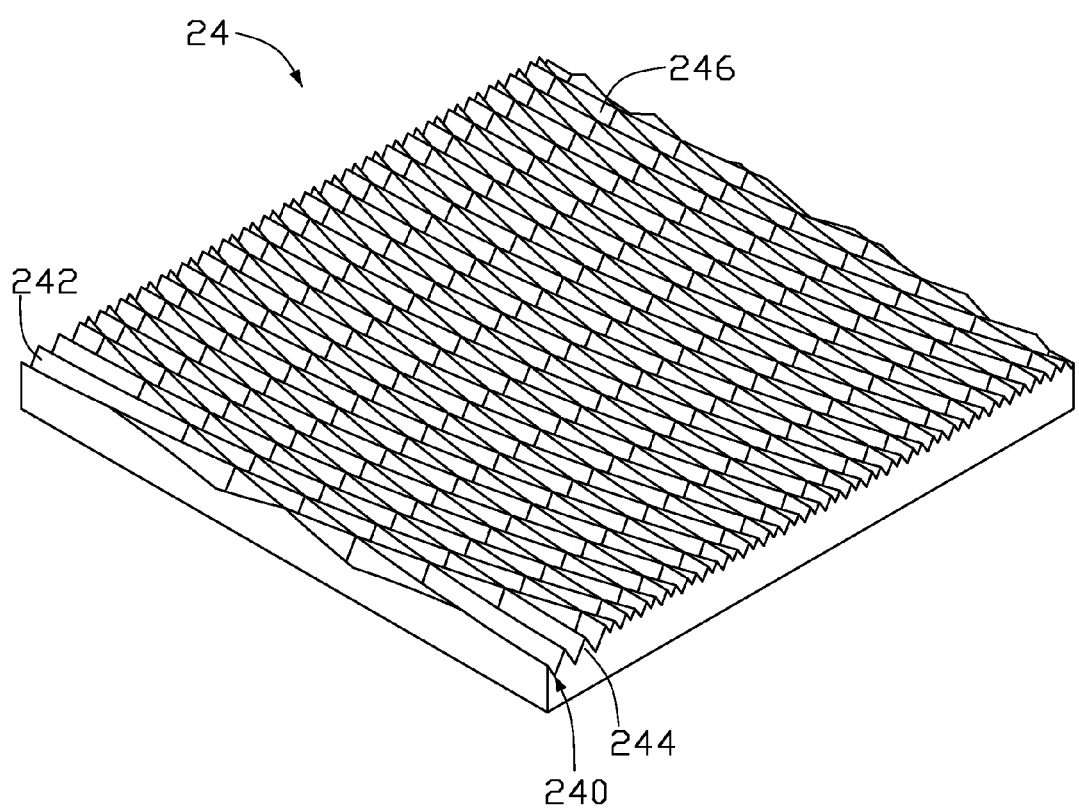
FIG. 2 is an isometric view of the prism sheet of FIG. 1.
Figure 3:
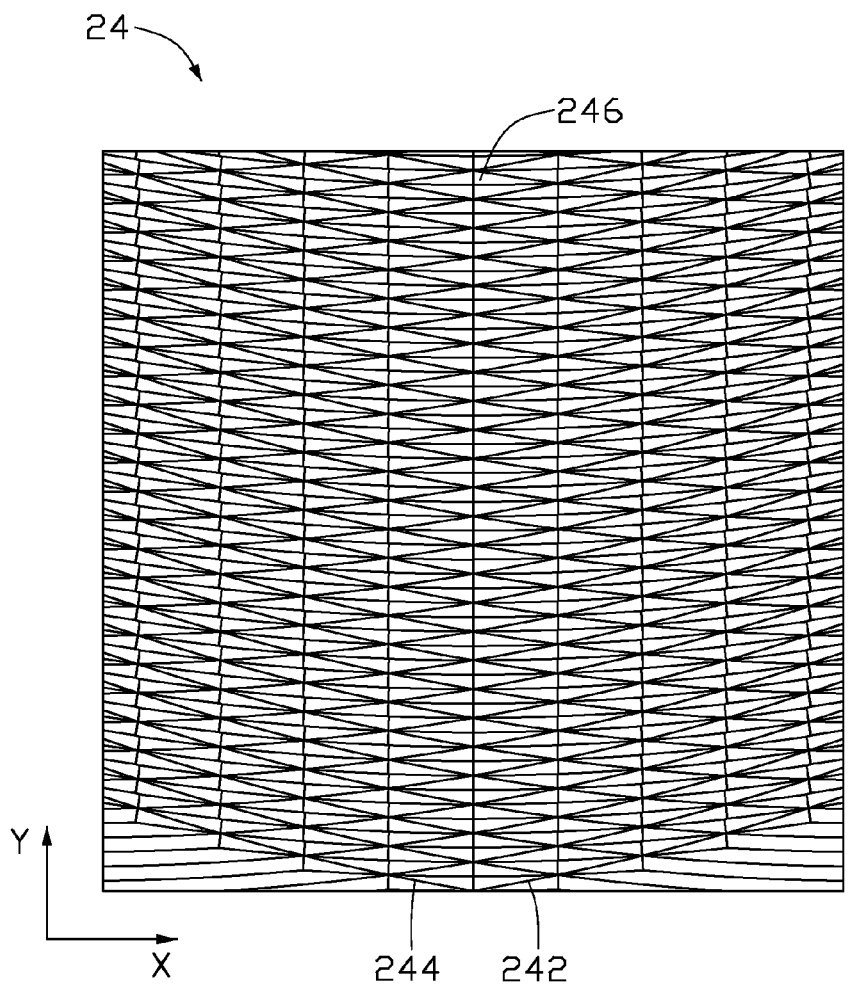
FIG. 3 is a top plan view of the prism sheet shown in FIG. 2.
Figure 4:
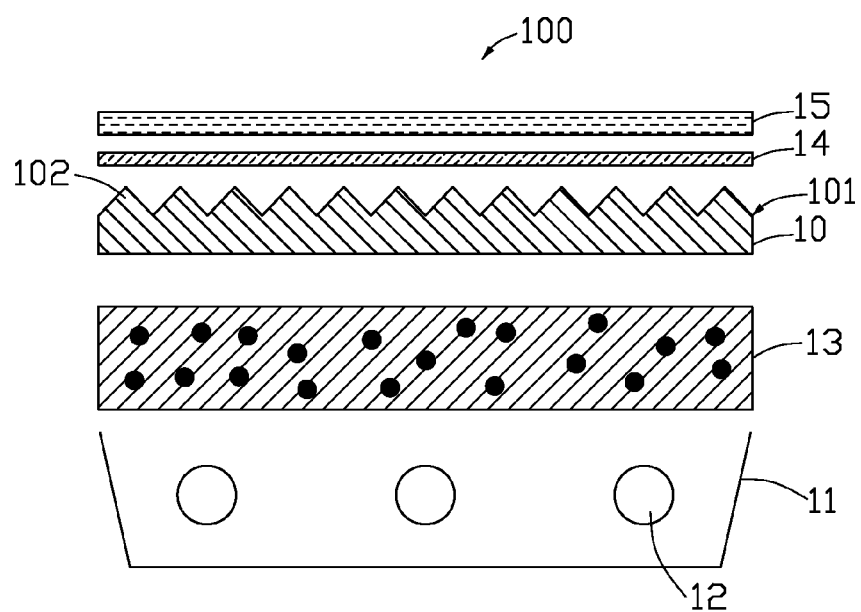
FIG. 4 is an exploded, side cross-sectional view of a conventional liquid crystal display having a prism sheet.
Figure 5:
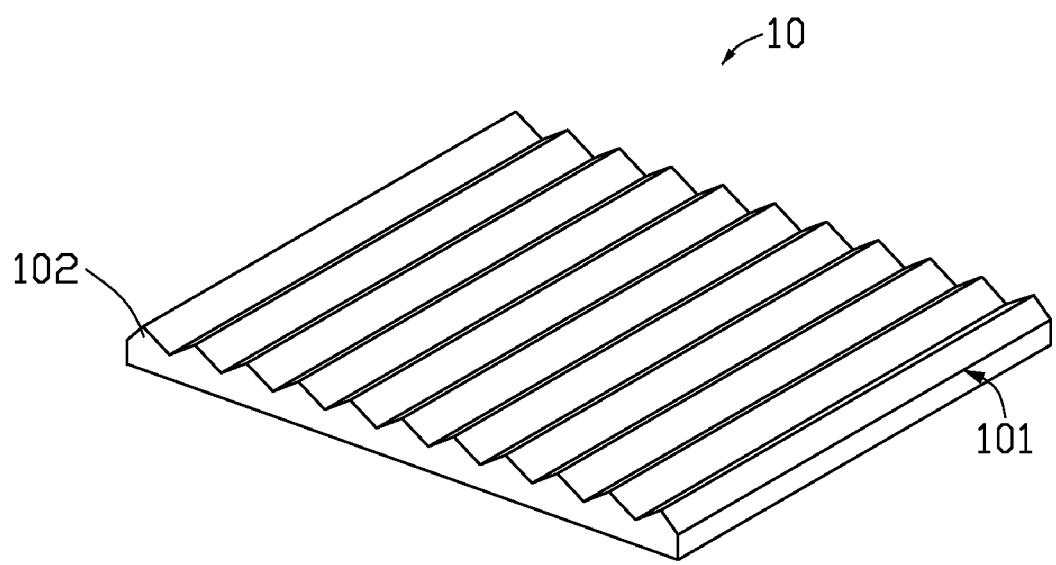
FIG. 5 is an isometric view of the prism sheet of FIG. 4.

Referring to FIGS. 2 and 3, the thickness of the prism sheet 24 is configured to be in the range from about 0.5 millimeters to about 3 millimeters. The prism sheet 24 includes a main body having a surface 240. A plurality of first V-shaped micro-protrusions 242 and second V-shaped micro-protrusions 244 extend on the surface 240. Each first V-shaped micro-protrusions 242 extends along a circular arc having a same predetermined curvature. Centers of circles defined by the circular arcs are collinear. Preferably, the centers are arranged apart in a constant distance to design the first V-shaped micro-protrusions 242 aligned side by side. Likewise, each second V-shaped micro-protrusions 244 extends along a circular arc having a same predetermined curvature. Centers of circles defined by the circular arcs are collinear. Preferably, the centers are arranged apart in a constant distance to design the second V-shaped micro-protrusions 244 aligned side by side.

It should be noted that the first V-shaped micro-protrusions 242 and the second V-shaped micro-protrusions 244 can extend along circular arcs having different predetermined curvatures. The radii of the circular arcs are large in comparison to the dimension of the prism sheet, the radii can be as large as 10 meters.

The first V-shaped micro-protrusions 242 intersect with the second V-shaped micro-protrusions 244. Corresponding adjacent first V-shaped micro-protrusions 242 and correspondingly adjacent second V-shaped micro-protrusions 244 cooperatively define a plurality of microstructures 246. Each of the microstructures 246 has four side surfaces connected in order. The microstructures 246 can collimate light emitted from the light diffusion plate 23, thereby improving the brightness of light illumination. In the illustrated embodiment, a distance between adjacent first V-shaped micro-protrusions 242 is at a first predetermined distance. A distance between adjacent second V-shaped micro-protrusions 244 is at a second predetermined distance. The first predetermined distance and the second predetermined distance are configured to be in the range from about 0.025 millimeters to about 1 millimeter. A vertex angle of each first V-shaped micro-protrusion 242 and second V-shaped micro-protrusion 244 is configured to be in the range from about 60 degrees to about 120 degrees.

When the prism sheet 20 is utilized in a typical liquid crystal display, light emitted from lamps 22 enters the light diffusion plate 23. The light is substantially diffused in the light diffusion plate 23. Subsequently, much or most of the light is condensed by the first V-shaped micro-protrusions 242 and the second V-shaped micro-protrusions 244 of the prism sheet 24 when exiting the light output surface 240. As a result, a brightness of the liquid crystal display device is increased. In addition, because the arrangement of the first V-shaped micro-protrusions 242 and the second V-shaped micro-protrusions 244 are aligned obliquely with the LCD pixels either in the X-direction or the Y-direction, moire pattern interference between the prism sheet 20 and the pixel pitch of LCD panel is decreased or even eliminated. Furthermore, there is no need to add an upper light diffusion film between the prism sheet 24 and the LCD panel 25. This increases an efficiency of light utilization. Moreover, when the prism sheet 24 is utilized in the liquid crystal display, it can replace the conventional combination of a prism sheet and an upper light diffusion film. Thereby, the assembly process of the liquid crystal display is simplified. Moreover, the single prism sheet 24 instead of the combination of two optical sheets/films reduces costs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A prism sheet, comprising:
    a main body defining a surface;
    a plurality of first V-shaped micro-protrusions formed on the surface, wherein the first V-shaped micro-protrusions are arranged regularly and each of the first V-shaped micro-protrusions extends along a first curved direction; and
    a plurality of second V-shaped micro-protrusions formed on the surface, wherein the second V-shaped micro-protrusions are arranged regularly and each of the second V-shaped micro-protrusions extends along a second curved direction, the first V-shaped micro-protrusions intersecting with the second V-shaped micro-protrusions.

2. The prism sheet as claimed in claim 1, wherein the first curved direction of the first V-shaped micro-protrusions is along a plurality of circular arcs having a same curvature, and the centers of circles defined by the circular arcs are collinear.

3. The prism sheet as claimed in claim 2, wherein the first V-shaped micro-protrusions are arranged apart in a constant distance.

4. The prism sheet as claimed in claim 2, wherein the radii of the circular arcs are 10 meters.

5. The prism sheet as claimed in claim 1, wherein the second curved direction of the second V-shaped micro-protrusions is along a plurality of circular arcs having a same curvature, and the centers of circles defined by the circular arcs are collinear.

6. The prism sheet as claimed in claim 5, wherein the second V-shaped micro-protrusions are arranged apart in a constant distance.

7. The prism sheet as claimed in claim 5, wherein the radii of the circular arcs are 10 meters.

8. The prism sheet as claimed in claim 1, wherein the vertex angle of each of the first and second V-shaped micro-protrusions is in the range from about 60 degrees to about 120 degrees.

9. The prism sheet as claimed in claim 1, wherein the thickness of the prism sheet is in the range from about 0.5 millimeters to about 3 millimeters.

10. A liquid crystal display device comprising:
    a light source;
    a light diffusion plate disposed above the light source;
    a prism sheet disposed above the light diffusion plate, the prism sheet having a surface, a plurality of first V-shaped micro-protrusions formed on the surface, wherein the first V-shaped micro-protrusions are arranged regularly and each of the first V-shaped micro-protrusions extends along a first curved direction, and a plurality of second V-shaped micro-protrusions formed on the surface, wherein the second V-shaped micro-protrusions are arranged regularly and each of the second V-shaped micro-protrusions extends along a second curved direction, the first V-shaped micro-protrusions intersecting with the second V-shaped micro-protrusions; and
    a liquid crystal display panel disposed above the prism sheet.

11. The liquid crystal display device as claimed in claim 10, wherein the first curved direction of the first V-shaped micro-protrusions is along a plurality of circular arcs having a same curvature, and the centers of circles defined by the circular arcs are collinear.

12. The liquid crystal display device as claimed in claim 11, wherein the first V-shaped micro-protrusions are arranged apart in a constant distance.

13. The liquid crystal display device as claimed in claim 11, wherein the radii of the circular arcs are 10 meters.

14. The liquid crystal display device as claimed in claim 10, wherein the second curved direction of the second V-shaped micro-protrusions is along a plurality of circular arcs having a same curvature, and the centers of circles defined by the circular arcs are collinear.

15. The liquid crystal display device as claimed in claim 14, wherein the second V-shaped micro-protrusions are arranged apart in a constant distance.

16. The liquid crystal display device as claimed in claim 14, wherein the radii of the circular arcs are 10 meters.

17. The liquid crystal display device as claimed in claim 10, wherein the vertex angle of each of the first and second V-shaped micro-protrusions is in the range from about 60 degrees to about 120 degrees.

18. The liquid crystal display device as claimed in claim 10, wherein the thickness of the prism sheet is in the range from about 0.5 millimeters to about 3 millimeters.

* * * * *